Patented Dec. 4, 1945

2,390,366

UNITED STATES PATENT OFFICE 2,390,366

GLASS ENAMEL COMPOSITION

Carl J. Harbert, Shaker Heights, Ohio, and William C. Morris, Gainesville, Fla., assignors to The Harshaw Chemical Company, Elyria, Ohio, a corporation of Ohio No Drawing. Application October 27, 1944, Serial No. 560,712

8 Claims. (Cl. 106—49)

This invention relates to low fusing enamels suitable for application to glass and to glass articles having such enamels applied thereon.

Prior to our invention, it has been known to incorporate titania and zirconia in enamels of this type for securing acid and alkali resistance. U. S. Patent No. 2,225,159 teaches that titania will impart acid resistance to this type of enamel, while U. S. Patent No. 2,278,868 teaches that zirconia will impart alkali resistance to such enamels. U. S. Patent No. 2,338,099 teaches the use of zirconium dioxide and alkali metal fluorides in the same enamel, the fluorides being added for the purpose of reducing the melting point and affording improved brilliance of the glaze when pigmented with cadmium colors. The alkali metal fluorides result in lowering of the melting point and improving the brilliance of the reds (when colored with cadmium selenium pigments) but unfortunately they also result in lowering of the acid resistance.

We have now discovered that zirconium tetrafluoride and zirconyl fluorides can be substituted for the combination of zirconium oxide and the alkali fluorides with the result that the acid resistance of the enamel is not reduced and the alkali resistance is improved. At the same time, excellent brilliance is obtained when the glaze is pigmented with cadmium selenium colors, fully equal to the brilliance obtained by the use of the combination of zirconium dioxide and alkali metal fluorides and the resulting glazes are softer than those produced with zirconium oxide without the alkali metal fluorides, that is, they melt at a lower temperature.

While zirconium tetrafluoride is the preferred compound for addition to the smelter batch, we may also use compounds which yield zirconium fluoride on smelting, such as ammonium fluozirconate and the fluozirconates of the alkali metals and alkaline earth metals. We may also use zirconyl fluorides, $ZrOF_2$ and the others which are richer in fluorine than $ZrOF_2$. (Under some conditions of smelting the $ZrF_4$ and zirconyl fluorides richer in fluorine than $ZrOF_2$ may become oxidized as high as $ZrOF_2$ but under normal conditions we find no evidence of oxidation beyond $Zr_2OF_6$.) Titani may be used for increasing acid resistance, and we find zirconium fluoride and the zirconyl fluorides to be quite compatible with titania. With titania in the melt, adequate acid resistance can be retained while using very substantial quantities of zirconium fluoride or the zirconyl fluorides mentioned. We obtain maturing temperatures of 640° C. and lower and get adequate alkali and acid resistance, good fit on the glass and excellent brilliance in the reds.

While we prefer to use zirconium fluoride or the other zirconium fluoro compounds above referred to or mixtures thereof as the sole source of zirconium while omitting alkali fluorides altogether, it obviously is possible to make use of zirconium fluoro compounds and zirconium oxide with or without the addition of some proportion of alkali metal fluorides. Again, we make use of zirconium fluoride or a zirconyl fluoride in combination with other agents for imparting alkali resistance, such as barium stannate, barium zirconate, etc.

Suitable composition ranges, on the analytical basis, i. e., theoretical melted composition, are as follows: Lead oxide 40 to 60 percent, silica 22 to 32 per cent, boric acid 3 to 12 per cent, titania 0 to 5 per cent, preferably 2 to 4 per cent, alkali oxides ($Li_2O$, $Na_2O$, $K_2O$) 3 to 7 per cent, preferably about 5 per cent, barium oxide 0 to 6 per cent, preferably 1 to 5 per cent, cadmium oxide 0 to 5 per cent, zinc oxide 0 to 2 per cent, and zirconium tetrafluoride or a zirconyl fluoride 1 to 10 per cent, preferably 2 to 6 per cent. Percentages and proportions are by weight based on the weight of the frit and exclusive of added pigments or indifferent materials.

By referring to composition ranges on the analytical basis or to melted compositions, we intend to indicate that the constituent elements will be found on analysis in those proportions, but we do not intend to indicate the kind of physical or chemical association which may exist in the glaze itself.

In the following table, we have indicated two examples of smelter batch compositions and the resulting theoretical melted compositions.

| Sample number | 1 | 2 |
|---|---|---|
| Smelter Batch (Parts by Weight) | | |
| Sodium silicate | 16.30 | 16.10 |
| Lead monosilicate | 52.50 | 50.50 |
| Zinc oxide | 0.80 | 0.80 |
| Cadmium hydrate | 2.60 | 2.50 |
| Silica | 10.60 | 11.00 |
| Barium carbonate | 3.30 | 3.30 |
| Boric acid | 7.50 | 7.60 |
| Titania | 1.70 | 1.70 |
| Zirconium tetrafluoride | 4.70 | |
| Ammonium fluozirconate | | 6.50 |
| Theoretical Melted Composition (Parts by Weight) | | |
| $Na_2O$ | 4.03 | 3.88 |
| $BaO$ | 2.70 | 2.75 |
| $PbO$ | 46.60 | 46.10 |
| $ZnO$ | 0.84 | 0.86 |
| $CdO$ | 2.40 | 2.35 |
| $B_2O_3$ | 4.44 | 4.60 |
| $SiO_2$ | 32.30 | 32.82 |
| $TiO_2$ | 1.78 | 1.82 |
| $ZrF_4$ | 4.91 | 4.82 |

These examples are merely representative of many compositions possible according to the invention. Lead borosilicate is the fundamental basis of the enamel which may contain various proportions of the oxides of lead, sodium, barium, boron and silicon according to desired maturing temperature, coefficient of expansion, etc., all of which is understood by persons skilled in the art. Titania functions to improve acid resistance, the amount not being critical. If acid resistance is not essential, titania can be omitted. Cadmium oxide is present in these examples to condition the frit for use of a cadmium color to be introduced as a mill addition.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the examples, melt it to a clear melt, frit it into water and then grind the frit with the pigment and other usual mill additions. It is possible, of course, to add some pigments in the batch, that is, as smelter additions, but we prefer to add them at the mill. The pigment selected should be such that when the enamel is applied to glass and fused on the pigment particles do not melt. Thus the preferred enamel consists of pigment particles dispersed in a melted glaze matrix of the compositions indicated above.

Having thus described our invention, what we claim is:

1. A glaze composition suitable for decorating glassware having a fusing temperature not higher than 640° C. and comprising a lead borosilicate type of glaze containing as a smelted in constituent a substance of the class consisting of zirconium tetrafluoride, $ZrOF_2$, and zirconyl fluorides richer in fluorine than $ZrOF_2$.

2. A glaze suitable for decorating glassware having a fusing temperature not higher than 640° C. and comprising a pigment dispersed in a lead borosilicate glaze matrix and said matrix containing as a smelted in addition a substance of the class consisting of zirconium tetrafluoride, $ZrOF_2$, and zinconyl fluorides richer in fluorine than $ZrOF_2$ in proportion from 1% to 10% by weight.

3. A glass article having at least a portion of its surface coated with the glaze defined in claim 1.

4. A glass article having at least a portion of its surface coated with the glaze defined in claim 2.

5. A lead borosilicate glaze of low melting point suitable for application to glass comprising a pigment and a melted glaze matrix, said matrix being on the analytical basis composed of the following compounds in approximately the proportions indicated:

| | Per cent |
|---|---|
| PbO | 40–60 |
| $Na_2O + K_2O + Li_2O$ | 3– 7 |
| BaO | 0– 6 |
| $SiO_2$ | 22–32 |
| $B_2O_3$ | 3–12 |
| $TiO_2$ | 0– 5 |
| A substance of the class consisting of zirconium tetrafluoride, $ZrOF_2$, and zirconyl fluorides richer in fluorine than $ZrOF_2$ | 1–10 |

6. A glass article having at least a portion of its surface coated with the glaze defined in claim 5.

7. A glaze suitable for decorating glassware having a fusing temperature not higher than 640° C. and comprising a pigment dispersed in a lead borosilicate glaze matrix and said matrix containing as a smelted in addition a substance of the class consisting of zirconium tetrafluoride, $ZrOF_2$, and zirconyl fluorides richer in fluorine than $ZrOF_2$, in proportion from 2% to 6% by weight.

8. A lead borosilicate glaze of low melting point suitable for application to glass comprising a pigment and a melted glaze matrix, said matrix being on the analytical basis composed of the following compounds in approximately the proportions indicated:

| | Per cent |
|---|---|
| PbO | 40–60 |
| $Na_2O + K_2O + Li_2O$ | 3– 7 |
| BaO | 0– 6 |
| $SiO_2$ | 22–32 |
| $B_2O_3$ | 3–12 |
| $TiO_2$ | 0– 5 |
| A substance of the class consisting of zirconium tetrafluoride, $ZrOF_2$, and zirconyl fluorides richer in fluorine than $ZrOF_2$ | 2– 6 |

CARL J. HARBERT.
WILLIAM C. MORRIS.